(12) United States Patent
Weil et al.

(10) Patent No.: US 10,343,941 B2
(45) Date of Patent: Jul. 9, 2019

(54) GLASS BATCH MATERIAL AND PROCESS FOR MAKING GLASS

(71) Applicant: Owens-Brockway Glass Container Inc., Perrysburg, OH (US)

(72) Inventors: Scott Weil, Maumee, OH (US); Pramod K Sharma, Ann Arbor, MI (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 78 days.

(21) Appl. No.: 15/625,551

(22) Filed: Jun. 16, 2017

(65) Prior Publication Data

US 2018/0362380 A1 Dec. 20, 2018

(51) Int. Cl.

| | |
|---|---|
| *C03B 1/02* | (2006.01) |
| *C03B 5/235* | (2006.01) |
| *C03C 3/12* | (2006.01) |
| *C03C 3/04* | (2006.01) |
| *C03C 1/02* | (2006.01) |
| *C03C 1/00* | (2006.01) |
| *C03C 17/28* | (2006.01) |

(52) U.S. Cl.
CPC .............. *C03B 1/02* (2013.01); *C03B 5/2353* (2013.01); *C03C 1/002* (2013.01); *C03C 1/026* (2013.01); *C03C 3/04* (2013.01); *C03C 3/12* (2013.01); *C03C 17/28* (2013.01); *C03B 2211/23* (2013.01)

(58) Field of Classification Search
CPC ..... C03B 1/02; C03B 5/2353; C03B 2211/23; C03C 1/002; C03C 1/026; C03C 3/04; C03C 3/12; C03C 17/28
USPC ........................................................ 428/403
See application file for complete search history.

(56) References Cited

U.S. PATENT DOCUMENTS

| | | |
|---|---|---|
| 2,366,473 A | 1/1945 | Bair |
| 2,578,110 A | 12/1951 | Tooley |
| 3,150,991 A | 9/1964 | Monks, Jr. |
| 3,172,648 A | 3/1965 | Brichard |
| 3,203,816 A | 8/1965 | Bull et al. |
| 3,234,034 A | 2/1966 | Jasinski et al. |
| 3,542,534 A | 11/1970 | Yamamoto |
| 3,545,988 A | 12/1970 | Slade |
| 3,589,885 A | 6/1971 | Monks |
| 3,725,022 A | 4/1973 | Mills |
| 3,788,832 A | 1/1974 | Nesbitt et al. |
| 3,799,754 A | 3/1974 | Thomas |
| 3,823,920 A | 7/1974 | Mills et al. |
| 3,850,606 A | 11/1974 | Rough |
| 3,907,956 A | 9/1975 | Meunier |
| 3,951,635 A | 4/1976 | Rough, Sr. |
| 3,956,446 A | 5/1976 | Eirich et al. |
| 3,988,138 A | 10/1976 | Rough |
| 4,293,324 A | 10/1981 | Saeman |
| 4,310,342 A | 1/1982 | Richards |
| 4,330,315 A | 5/1982 | Nelson et al. |
| 4,354,864 A | 10/1982 | Saeman |
| 4,418,153 A | 11/1983 | Saeman |
| 4,525,722 A | 6/1985 | Sachdev et al. |
| 4,549,824 A | 10/1985 | Sachedev et al. |
| 4,551,161 A * | 11/1985 | Savolskis ................ C03C 1/026 501/12 |
| 5,278,023 A | 1/1994 | Bills et al. |
| 5,308,737 A | 5/1994 | Bills et al. |
| 5,747,217 A | 5/1998 | Zaklika et al. |
| 6,348,939 B1 | 2/2002 | Xu et al. |
| 7,803,730 B2 | 9/2010 | Hockman et al. |
| 2012/0176016 A1 | 7/2012 | Bonitatibus, Jr. et al. |
| 2013/0074930 A1 | 3/2013 | Lichtenstein et al. |
| 2017/0157582 A1* | 6/2017 | Peterson ................. C03C 1/026 |

FOREIGN PATENT DOCUMENTS

| | | | |
|---|---|---|---|
| EP | 0166398 | * | 1/1986 |
| EP | 0166398 A2 | | 1/1986 |
| EP | 0152795 B1 | | 3/1990 |
| EP | 1728772 A1 | | 12/2006 |
| ES | 479533 A1 | | 4/1979 |
| GB | 1325886 | | 8/1973 |
| WO | 2007141196 A1 | | 12/2007 |
| WO | WO2007/141196 | * | 12/2007 |
| WO | WO 2013/110810 A1 | | 8/2013 |

OTHER PUBLICATIONS

PCT International Search Report and Written Opinion, International Serial No. PCT/US2018/031465, International Filing Date: May 8, 2018, Applicant: Owens-Brockway Glass Container Inc., dated May 8, 2018.

* cited by examiner

*Primary Examiner* — Leszek B Kiliman

(57) ABSTRACT

Glass batch materials and processes for preparing and melting structured pellets of glass batch materials to produce molten glass. A structured pellet of glass batch materials may include a core and a shell surrounding the core. The core may include a mixture of glass-forming materials and the shell may include a thermally-activated material. The thermally-activated material may be formulated to undergo an exothermic chemical reaction when heated to a temperature at or above a threshold temperature such that heat is transferred from the shell to the mixture of glass-forming materials in the core.

16 Claims, 1 Drawing Sheet

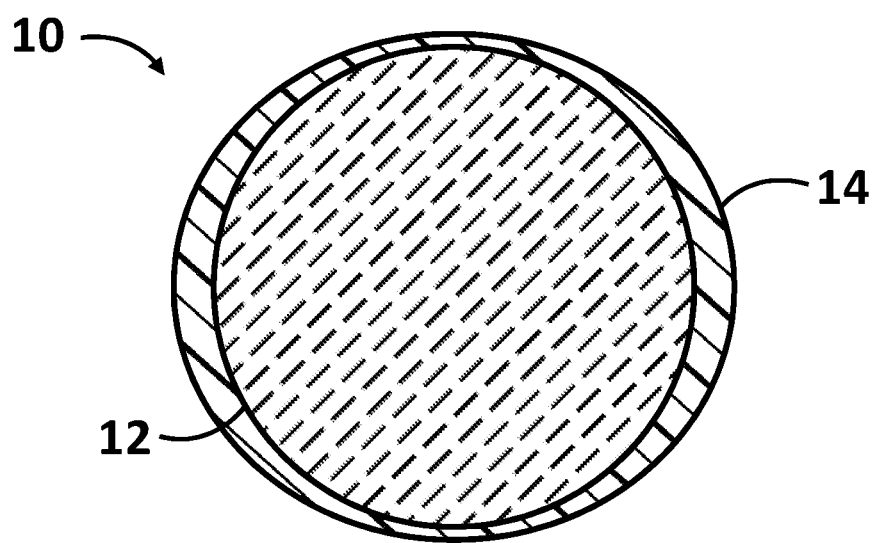

GLASS BATCH MATERIAL AND PROCESS FOR MAKING GLASS

The present disclosure is directed to glass batch materials and to processes for preparing and melting said glass batch materials to produce molten glass.

BACKGROUND AND SUMMARY OF THE DISCLOSURE

Silica-based glass, such as soda-lime-silica glass, is prevalent in the manufacture of glass containers and other articles. Molten glass used to make such articles is conventionally prepared by introducing a loose mixture of individual solid glass-forming materials known as a "glass batch" into a glass furnace or tank and melting the glass batch at elevated temperature to form a substantially homogenous glass melt.

A general object of the present disclosure, in accordance with one aspect of the disclosure, is to provide a structured pellet of glass batch material that can be melted at a lower temperature and in less time than a conventional loose mixture of glass-forming materials, and thus can improve the energy efficiency of the glass manufacturing process.

The present disclosure embodies a number of aspects that can be implemented separately from or in combination with each other.

A structured pellet of glass batch material for producing glass in accordance with one aspect of the disclosure includes: a core and a shell surrounding the core. The core includes a mixture of glass-forming materials and the shell includes a thermally-activated material. The thermally-activated material is formulated to undergo an exothermic chemical reaction when heated to a temperature at or above a threshold temperature such that heat is transferred from the shell to the mixture of glass-forming materials in the core.

In accordance with another aspect of the disclosure, there is provided a process for making glass. A structured pellet of glass batch materials is provided that includes a core and a shell surrounding the core. The core includes a mixture of glass-forming materials and the shell includes a thermally-activated material. The shell is heated to a temperature at or above a threshold temperature to initiate an exothermic chemical reaction that supplies heat to the mixture of glass-forming materials in the core. The core is heated at a sufficient temperature and for a sufficient amount of time to melt the mixture of glass-forming materials in the core and form a body of molten glass.

In accordance with yet another aspect of the disclosure, there is provided a process for producing a structured pellet glass of glass batch materials. The process includes: providing a particulate mixture of glass-forming materials; mixing the glass-forming materials with a binder to form a plurality of agglomerated bodies; and coating the agglomerated bodies with an overlying layer of a coating material that includes a thermally-activated material. The thermally-activated material is formulated to undergo an exothermic chemical reaction when heated to a temperature at or above a threshold temperature.

BRIEF DESCRIPTION OF THE DRAWINGS

The disclosure, together with additional objects, features, advantages and aspects thereof, will be best understood from the following description, the appended claims and the accompanying drawing(s), in which:

FIG. 1 is an idealized cross-sectional view of a structured pellet of glass batch materials in accordance with an illustrative embodiment of the present disclosure.

DETAILED DESCRIPTION

FIG. 1 illustrates in idealized fashion a structured pellet 10 of glass batch materials that can be melted, for example, in a glass furnace to produce molten glass. The structured pellet 10 includes an inner core 12 and an outer shell 14 surrounding the core 12. The inner core 12 of the pellet 10 includes a mixture of glass-forming materials (or glass batch materials) and the outer shell 14 includes a thermally-activated material that is formulated to supply heat to the mixture of glass-forming materials in the core 12 to improve the energy efficiency of the melting process. The term "core," as used herein, refers to a coherent mass of solid particles that have been agglomerated or consolidated together by conventional agglomeration processes and equipment.

The thermally-activated material in the outer shell 14 of the pellet 10 may comprise a material that is formulated to undergo an exothermic chemical reaction when heated to a temperature at or above a threshold temperature such that heat is transferred from the shell 14 to the mixture of glass-forming materials in the core 12. More specifically, during the early stages of melting, the thermally-activated material in the outer shell 14 of the pellet 10 may be heated to a temperature at or above a threshold temperature to trigger an exothermic chemical reaction which generates heat. The heat generated by the exothermic chemical reaction is then transferred, at least in part, to the mixture of glass-forming materials in the core 12, which reduces the amount of energy and the amount of time required to subsequently melt the mixture of glass-forming materials in the core 12 into a body of molten glass, as compared to conventional glass melting processes. In addition, without intending to be bound by theory, it is believed that the additional, localized source of heat provided by the exothermic chemical reaction occurring in the outer shell 14 of the pellet 10 and the thermally insulating properties of the shell 14 itself may allow the mixture of glass-forming materials in the core 12 to be melted at a relatively rapid pace. For example, it is believed that the close proximity between the shell 14 and the mixture of glass-forming materials in the core 12 may increase the amount of heat that is locally supplied to each of the glass-forming materials in the early stages of melting and also may help prevent or suppress heat loss or dissipation from the glass-forming materials in the core 12 during the melting process, which may further speed-up the melting rate of the mixture of glass-forming materials in the core 12, as compared to the traditional melting of a loose mixture of materials.

In one form, the thermally-activated material in the outer shell 14 may comprise a combustible organic material that undergoes an exothermic combustion reaction when heated in the presence of oxygen to a temperature at or above an ignition temperature or ignition point of the material. The term "combustible," as used herein, refers to a material that reacts with oxygen ($O_2$) when ignited to produce energy in the form of heat and sometimes light. The amount of heat produced during combustion of a specific material is referred to as the material's heat of combustion and is measured in units of energy per unit mass. The heat of combustion of the combustible organic material in the outer shell 14 of the pellet 10 may be in the range of 20-80 kJ/g. Some examples of combustible organic materials that may be included in the outer shell 14 of the pellet 10 include: organic polymers or resins, coal, coke, peat, bituminous materials, oil shale, tar sand, petroleum fractions and residues, biomass, cellulosic materials, and organic waste products, such as used tires, polymers, plastics, sludge, wood, and/or paper. Some examples of combustible organic polymers include: acrylate polymers, methacrylate polymers, e.g., poly(methyl methacrylate) (PMMA), polyepoxides, and polyamides. The combustible organic material may have an ignition temperature in the range of 200-700 degrees Celsius.

The mixture of glass-forming materials in the core 12 may comprise a homogenous mixture of substantially all of the glass-forming materials typically included in a conventional glass batch or typically needed to achieve a specific, desired glass composition. For example, the core 12 may include a combination of glass-forming materials that can be melted together to produce soda-lime glass, aluminosilicate glass, borosilicate glass, or any other type of silica-based glass. Silica-based glasses are primarily composed of silicon dioxide ($SiO_2$) and a combination of one or more additional metal oxides. For example, soda-lime glass primarily includes a combination of silicon dioxide ($SiO_2$), sodium dioxide ($Na_2O$), and calcium oxide (CaO), but also may include relatively small amounts of aluminum oxide ($Al_2O_3$), magnesium oxide (MgO), potassium oxide ($K_2O$), iron oxide ($Fe_2O_3$), titanium oxide ($TiO_2$), and sulfur trioxide ($SO_3$), to name a few. A typical soda-lime glass composition may include, for example, about 60 wt. % to about 75 wt. % $SiO_2$, about 10 wt. % to about 20 wt. % $Na_2O$, about 5 wt. % to about 20 wt. % CaO, and optionally about 0-4 wt. % $Al_2O_3$, about 0-4 wt. % MgO, about 0-2 wt. % $K_2O$, about 0.1 wt. % $Fe_2O_3$, about 0-0.5 wt. % $TiO_2$, and about 0-0.5 wt. % $SO_3$.

In one form, the mixture of glass-forming materials in the core 12 may include a mixture of metal oxides or metal-containing compounds that can be converted to metal oxides when melted. Examples of some types of metal-containing compounds that can effectively be converted to metal oxides when melted include metal-containing carbonates, e.g., sodium carbonate ($Na_2CO_3$) and calcium carbonate ($CaCO_3$), bicarbonates, e.g., sodium bicarbonate ($NaHCO_3$), sulfates, e.g., sodium sulfate ($Na_2SO_4$), nitrates, e.g., sodium nitrate ($NaNO_3$) and potassium nitrate ($KNO_3$), hydroxides, e.g., sodium hydroxide (NaOH) and calcium hydroxide ($Ca(OH)_2$), chlorides, fluorides, bromides, and iodides. These metal-containing compounds may be referred to as metal oxide precursor materials.

The structured pellet 10 may have a diameter in the range of 1 mm to 50 mm and may be formed from a particulate mixture of glass-forming materials having a mean particle diameter of less than 0.5 μm. The mixture of glass-forming materials in the core 12 may account for between 5 wt % and 95 wt % of the overall pellet 10, with the outer shell 14 of the pellet 10 accounting for the remainder.

A plurality of structured pellets 10 may be formed by a process that includes the following general steps: (i) providing a particulate mixture of glass-forming materials, (ii) mixing the mixture of glass-forming materials with a binder for a sufficient amount of time to form a plurality of agglomerated bodies, and then (iii) coating the agglomerated bodies with an overlying layer of a coating material that includes a thermally-activated material, as described above. The particulate mixture of glass-forming materials may comprise substantially all of the glass-forming materials needed to achieve a specific, desired glass composition. The binder may comprise a liquid binder and may include alkali or alkaline earth metal hydroxides, alkali or alkaline earth metal silicates, aluminum silicates, or a combination thereof, for example. The particulate mixture of glass-forming materials and the binder may be mixed together, for example, using mechanical stirrers, paddles, a pan, disk, or drum type granulator, or a fluidized bed. The coating material may comprise a gaseous, liquid, or solid material. The agglomerated bodies may be coated with the coating material by any suitable technique, including pan rolling, drum rolling, spray deposition, or heated or cooled fluidization, to name a few.

A plurality of structured pellets 10 may be melted to produce a body of molten glass by heating the pellets 10 to a temperature in the range of 1300-1500 degrees Celsius, for example, in a conventional glass melting tank or furnace. In one form, a plurality of structured pellets 10 may be continuously introduced, commonly referred to as being 'charged', into a conventional glass melting tank or furnace and deposited on a surface of a body of molten glass already in the tank or furnace. The pellets 10 may rapidly melt into the body of molten glass in the tank or furnace and molten glass may be continuously discharged from a downstream end of the tank or furnace.

The structured pellets can be charged into a conventional glass melting tank or furnace and used to produce molten glass without having to perform any modifications to existing equipment. And, in comparison to the conventional use of loose mixtures of glass-forming materials, the structured pellets 10 may decrease the amount of dust and/or particulate emissions generated during the material handling processes, which may reduce the need to wet the glass-forming materials or provide add-on particulate control devices such as electrostatic precipitators, bag houses or other filtration devices.

There thus has been disclosed a glass batch material and a process for making glass, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A structured pellet of glass batch materials that includes:
    a core including a mixture of glass-forming materials that upon melting produce a silica-based glass selected from soda-lime glass, aluminosilicate glass, or borosilicate glass; and
    a shell surrounding the core including a thermally-activated material, the thermally-activated material being a combustible organic material that reacts exothermically with oxygen at a temperature at or above an ignition temperature that ranges from 200° C. to 700° C.

2. The structured pellet set forth in claim 1 wherein the mixture of glass-forming materials includes a mixture of glass-forming metal oxides or metal oxide precursor materials.

3. The structured pellet set forth in claim 1 wherein the mixture of glass-forming materials produces soda-lime glass and includes at least one metal oxide precursor material selected from carbonates, bicarbonates, sulfates, nitrates, hydroxides, chlorides, fluorides, bromides, iodides, and mixtures thereof.

4. The structured pellet set forth in claim 1 wherein the mixture of glass-forming materials includes a mixture of particles having a mean particle diameter of less than 0.5 μm.

5. The structured pellet set forth in claim 1 wherein the combustible organic material has a heat of combustion in the range of 20-80 kJ/gram.

6. The structured pellet set forth in claim 1 wherein the combustible organic material comprises at least one monomer or polymer selected from the group consisting of acrylates, methacrylates, epoxies, and amides.

7. The structured pellet set forth in claim 1 wherein the core constitutes between 5-95 wt % of the structured pellet.

8. The structured pellet set forth in claim 1 having a diameter in the range of 1-50 mm.

9. A process for making glass that includes:
providing a structured pellet of glass batch materials that includes a core and a shell surrounding the core, wherein the core includes a mixture of glass-forming materials and the shell includes a thermally-activated material;
heating the shell to a temperature at or above a threshold temperature to initiate an exothermic chemical reaction that supplies heat to the mixture of glass-forming materials in the core; and
heating the core at a sufficient temperature in the range of 1300° C. to 1500° C. to melt the mixture of glass-forming materials in the core and form a body of molten glass.

10. The process set forth in claim 9 wherein the thermally-activated material comprises a combustible organic material that undergoes an exothermic combustion reaction when heated in the presence of oxygen to a temperature at or above an ignition temperature.

11. The process set forth in claim 9 wherein the threshold temperature of the thermally-activated material is less than the temperature at which the mixture of glass-forming materials is heated to form the body of molten glass.

12. The process set forth in claim 9 wherein the shell is heated to a temperature in the range of 200-700° C. to initiate the exothermic chemical reaction.

13. A process for producing a structured pellet of glass batch materials, the process including:
providing a particulate mixture of glass-forming materials that, when melted together, produce a silica-based glass selected from soda-lime glass, aluminosilicate glass, or borosilicate glass;
mixing the glass-forming materials with a binder to form a plurality of agglomerated bodies; and
coating the agglomerated bodies with an overlying layer of a coating material that includes a thermally-activated material, wherein the thermally-activated material is formulated to undergo an exothermic chemical reaction when heated to a temperature at or above a threshold temperature.

14. The process set forth in claim 13 wherein the coating material comprises a gaseous, liquid, or solid material.

15. The process set forth in claim 13 wherein the thermally-activated material is a combustible organic material that reacts exothermically with oxygen at a temperature at or above an ignition temperature that ranges from 200° C. to 700° C.

16. The process set forth in claim 15 wherein the combustible organic material has a heat of combustion in the range of 20-80 kJ/gram and comprises at least one monomer or polymer selected from the group consisting of acrylates, methacrylates, epoxies, and amides.

* * * * *